US006172817B1

(12) United States Patent
Senapati et al.

(10) Patent No.: US 6,172,817 B1
(45) Date of Patent: Jan. 9, 2001

(54) GRADED INDEX LENS FOR FIBER OPTIC APPLICATIONS AND TECHNIQUE OF FABRICATION

(75) Inventors: Udayan Senapati, Richmond; Ho-Shang Lee, El Sobrante, both of CA (US)

(73) Assignee: Dicon Fiberoptics, Inc., Berkeley, CA (US)

(*) Notice: Under 35 U.S.C. 154(b), the term of this patent shall be extended for 0 days.

(21) Appl. No.: 09/548,206

(22) Filed: Apr. 13, 2000

Related U.S. Application Data

(62) Division of application No. 09/268,187, filed on Mar. 15, 1999.

(51) Int. Cl.[7] .............................. G20B 3/00; C03C 15/00
(52) U.S. Cl. ......................... 359/654; 359/652; 65/30.1; 65/30.13
(58) Field of Search ................................. 359/652, 654; 385/34; 65/30.1, 30.13

(56) References Cited

U.S. PATENT DOCUMENTS

| | | |
|---|---|---|
| 2,566,252 | 8/1951 | Tooley et al. . |
| 2,960,723 | 11/1960 | Stark . |
| 3,467,513 | 9/1969 | Dockerty . |
| 3,699,472 * | 10/1972 | Young ........................ 372/29 |
| 3,846,100 | 11/1974 | Matsumura et al. . |
| 3,859,103 | 1/1975 | Yoshiyagawa et al. . |
| 3,894,857 | 7/1975 | Uchida et al. . |
| 3,923,486 * | 12/1975 | Kitano et al. ................ 65/400 |
| 3,938,974 * | 2/1976 | Macedo et al. .............. 65/399 |
| 3,941,474 | 3/1976 | Kitano et al. . |
| 4,199,343 | 4/1980 | Eolin et al. . |
| 4,246,016 | 1/1981 | Siegmund . |
| 4,462,663 * | 7/1984 | Shimizu et al. ............. 359/654 |
| 4,495,298 | 1/1985 | Yamagishi et al. . |
| 4,495,299 | 1/1985 | Noguchi et al. . |
| 4,756,733 | 7/1988 | Houde-Walter et al. . |
| 4,810,275 | 3/1989 | Gutu-Nelle et al. . |
| 4,851,023 | 7/1989 | Gonzales-Oliver . |

(List continued on next page.)

OTHER PUBLICATIONS

"Single–mode fiber coupling effciency with graded–index rod lenses," R. W. Gilsdorf et al., *Applied Optics*, vol. 33, No. 16, Jun. 1, 1994, pp. 3440–3445.

"Multinuclear nuclear magnetic resonance and Raman investigation of sodium borosilicate glass structures, " B.C. Bunker et al., *Physics and Chemistry of Glasses*, vol. 31, Feb.1990, pp. 30–41.

"Light–Focusing Glass Fiber and Rods, " H. Kita et al., *Journal of the American Ceramic Society* , vol. 54, No. 7, Jul.1971, pp. 321–326.

"Classical Glass Technology," M. Cable, *Materials Science and Technology:A Comprehensive Treatment, Glasses and Amorphus Materials*, vol. 9, Edited by J. Zarzycki, VCH Publishers, inc., New York, NY, May 1991, pp. 1–89.

*Primary Examiner*—Georgia Epps
*Assistant Examiner*—David N. Spector
(74) *Attorney, Agent, or Firm*—Majestic, Parsons, Siebert & Hsue P.C.

(57) ABSTRACT

A non-phase separable glass material for fabricating a GRIN lens comprises 5–20 mole % boron oxide and ratio R of network modifiers in mole % to the network former boron oxide in mole % is in the range of about 1–1.5. The melted preform of such glass material is extruded through an opening to form a glass rod where the extrusion process eliminates bubbles that may be present in the preform. Neodymium oxide may be added in the frit material for forming the preform to reduce friction forces in the extrusion process and reduces the stress in the glass rod. Centerless grinding may be performed to control the diameter and roughness of the surface of the rod to control the diffusion parameters during the subsequent ion-exchange.

6 Claims, 3 Drawing Sheets

U.S. PATENT DOCUMENTS

| | | |
|---|---|---|
| 4,867,774 | 9/1989 | Dorn . |
| 4,902,330 | 2/1990 | Sakai at el. . |
| 4,971,423 * | 11/1990 | Nakata et al. .................. 359/654 |
| 5,139,557 * | 8/1992 | Kittaka et al. .................. 65/30.13 |
| 5,349,473 * | 9/1994 | Kurasawa et al. .................. 359/654 |
| 5,540,746 | 7/1996 | Sasaki et al. . |
| 5,968,221 | 10/1999 | Blais . |

* cited by examiner

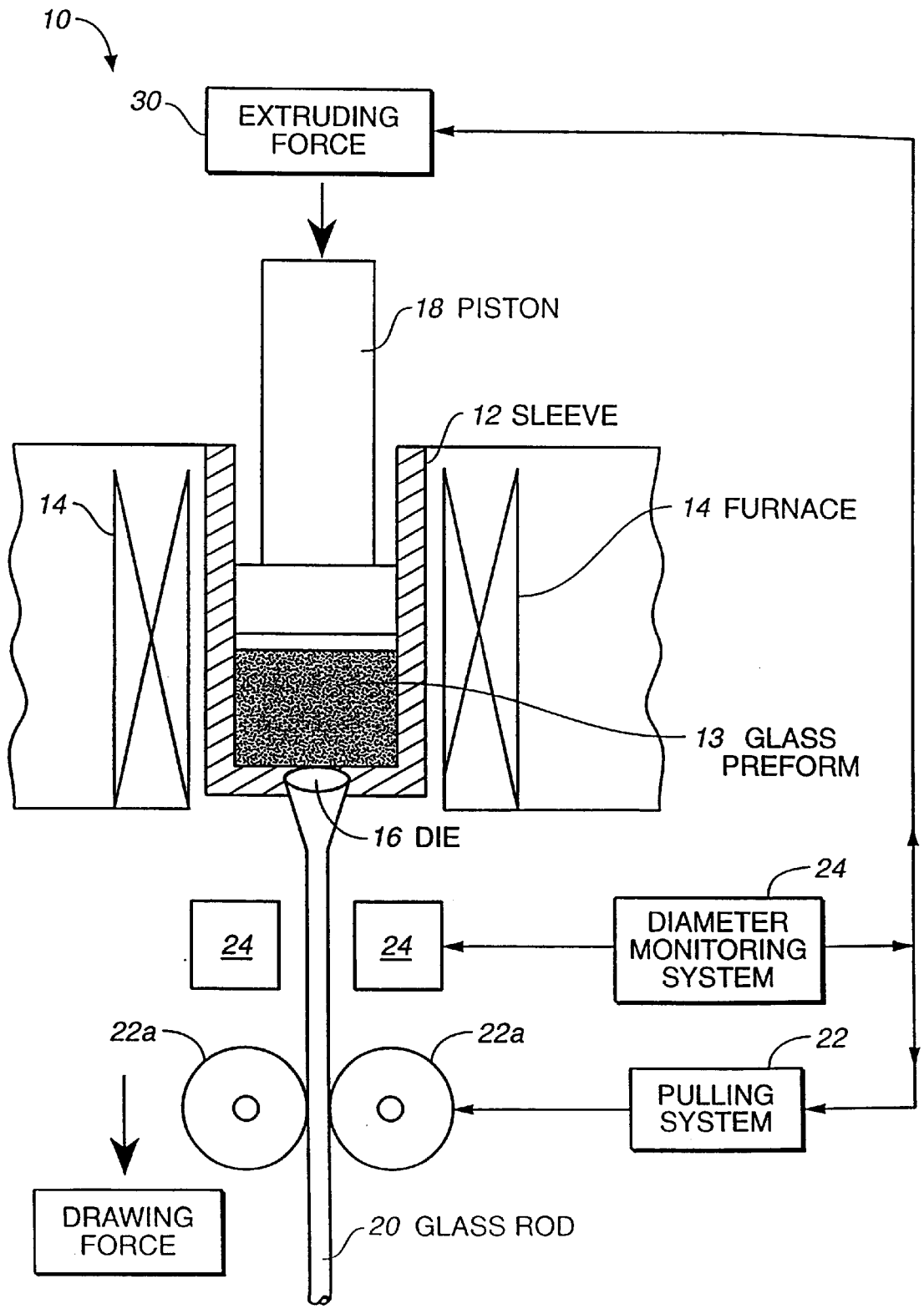
FIG._1

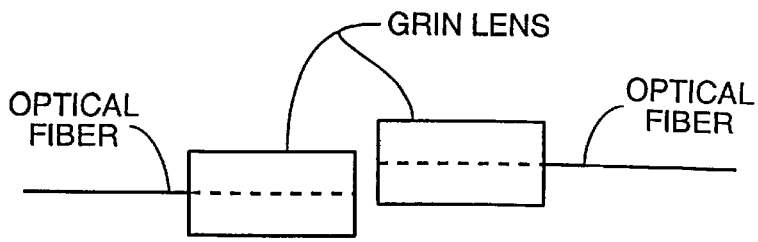
FIG._2a
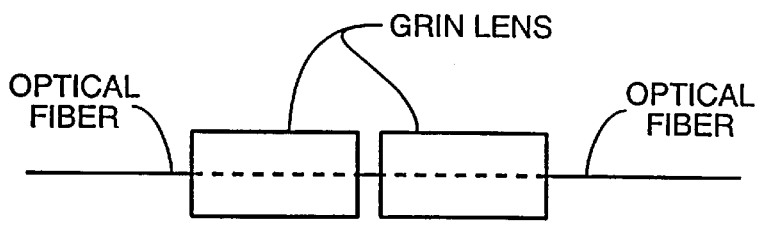
FIG._2b
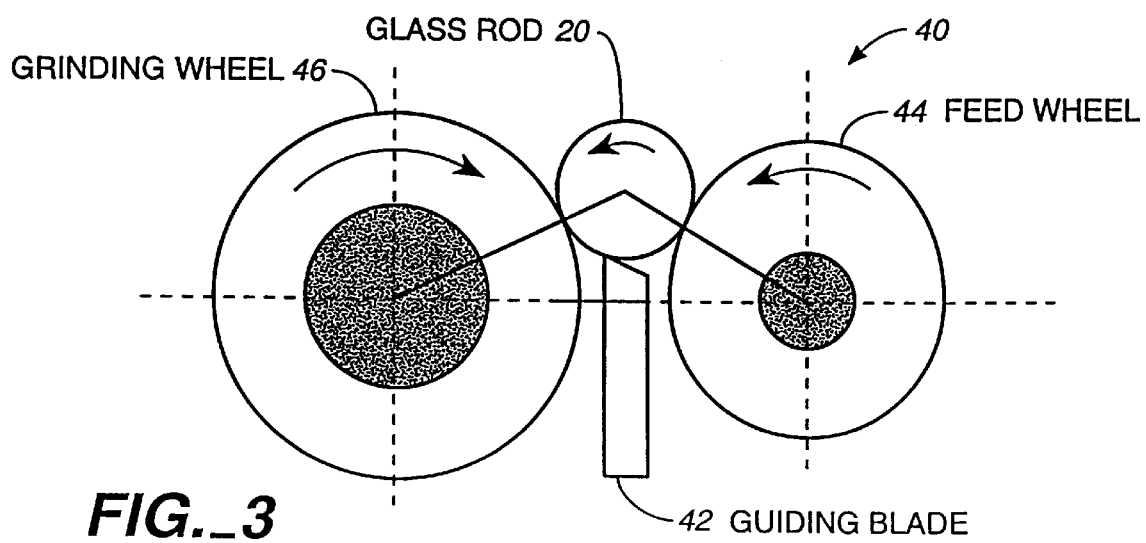
FIG._3

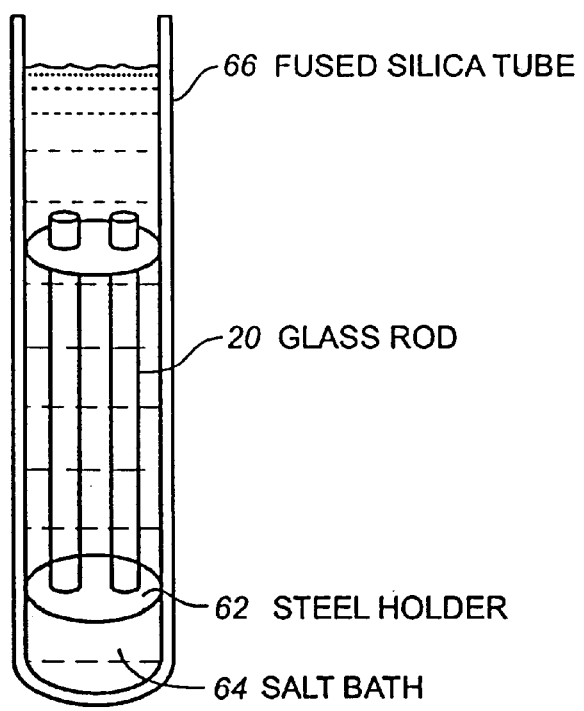
FIG._4
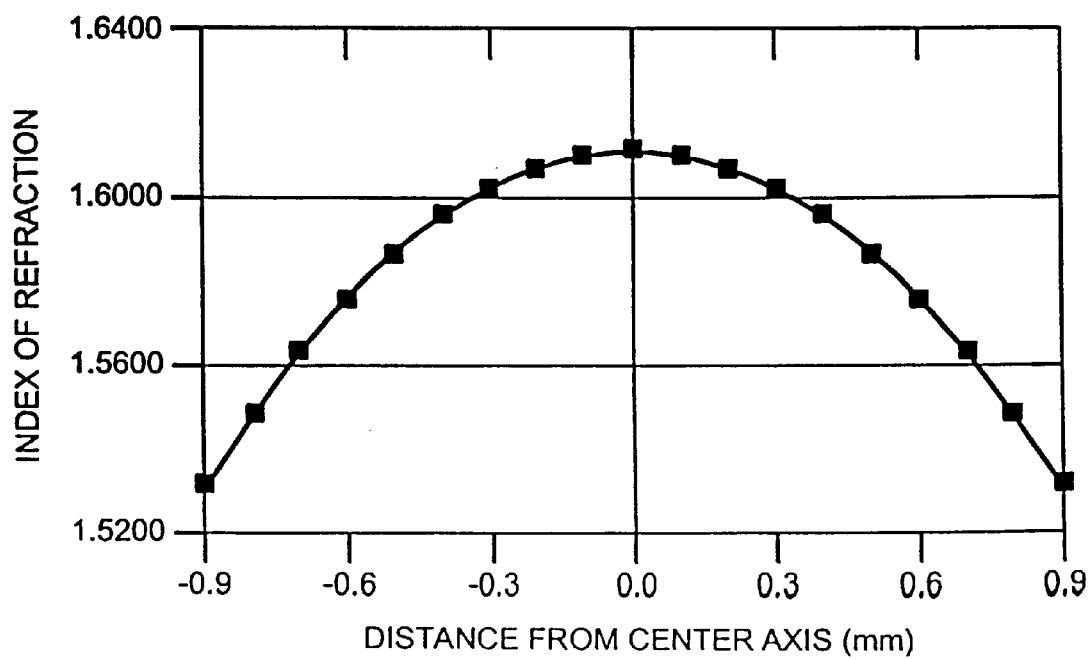
FIG._5

GRADED INDEX LENS FOR FIBER OPTIC APPLICATIONS AND TECHNIQUE OF FABRICATION

This is a division of application Ser. No. 09/268,187, filed Mar. 15, 1999.

BACKGROUND OF THE INVENTION

This invention relates to gradient index glass rods that can be used as lenses for applications such as collimation, coupling, focusing and active alignments.

Glasses as gradient index media have drawn much attention in fiber optics. A gradient index lens or GRIN lens is one in which the refractive index changes continuously axially, radially or spherically. Axial gradients have surfaces of constant index that are planes normal to the optical axis. In case of a radial GRIN lens, the most common configuration is one where refractive index is a maximum on the center axis and decreases with distance from the center axis. Such refractive index distributions are best approximated by parabolic functions of the type:

$$N(r)=N_0[1-\{(Ar^2)/2\}] \quad (1)$$

where N(r) is the refractive index at a point in the lens as a function of r which is the distance of the point from the center of the lens, $N_0$ the refractive index of the lens on the rod axis and A the lens constant. The radial refractive index distribution makes it feasible to focus a ray trajectory on the lens surface, inside the lens and also outside the lens. This gives additional leeway in designing cheap and efficient optical systems. Further, in a GRIN lens, rays of light follow sinusoidal paths whose trajectory is defined in terms of pitch P. One pitch is equivalent to the light wave traversing one sinusoidal cycle. It is related to the lens constant A, and the lens length L by the following relation:

$$P=(\sqrt{AL})/(2\pi) \quad (2)$$

Some earlier patents on the subject, such as U.S. Pat. Nos. 4,495,298, 3,941,474, 4,495,299 and 4,462,663, have already demonstrated that thallium based silicate glasses are ideal for such GRIN lens fabrication. But the methods of the above patents have drawn glass rods from the melt state, i.e., glasses were melted in platinum pots and rods were drawn through a nozzle at the bottom of the pot. Thallium is known to volatilize rapidly at higher temperatures. The drawing process, which is done at substantially higher temperatures makes process control more difficult.

It is therefore desirable to provide an improved lens fabrication method and improved composition of materials for forming such lens.

SUMMARY OF THE INVENTION

To form a good quality GRIN lens, it is important that the glass material forming the lens do not phase separate. If the glass phase separates, the glass in different regions would have different indices of refraction, light would be scattered by the lens.

This invention is based on the recognition that, in order for the glass material not to phase separate, the ratio R of network modifiers in mole % to network formers such as boron oxide in mole % should be in a certain range. The amount of boron oxide $B_2O_3$ in glass plays an important role in this respect. If too much boron oxide is present, the glass may tend to separate into two phases. The same is true if there is too little boron oxide. Applicants discovered that the optimum amount of boron oxide is in the range of about 5 to 20 mole %. Providing adequate boron oxide in the frit also reduces the melting temperature of the frit which is advantageous. Applicants also found that to avoid phase separation, R is preferably in the range of about 1 to 1.5.

Another difficulty in lens fabrication is the formation of bubbles which remain in the glass after the lens is formed. Obviously, such bubbles would distort the passage of light in the lens and is undesirable. While the formation of bubbles in the glass may be reduced by the addition of refining agents, such as arsenic or antimony oxides, it may be difficult to control the amount of refining agents so as to avoid coloring and light absorption problems. Applicants propose to force a preform of glass materials, such as those discussed above, through an opening, where the pressure applied to the preform may cause any bubbles present in the preform to burst, thereby eliminating or reducing the number of bubbles in the glass rod that is formed in the process. Preferably, this process is carried out through extrusion.

Applicants realize that small amounts of neodymium oxide present in the preform reduces the frictional forces between the apparatus used in extrusion, so that it is feasible to perform the extrusion process at lower pressures and temperatures and reduces the amount of stress in the glass rod that is obtained by the process.

BRIEF DESCRIPTION OF THE DRAWINGS

FIG. 1 is a schematic view of an extrusion apparatus in the process of extruding glass rods from a glass preform to illustrate the preferred embodiment of the invention.

FIGS. 2a and 2b are schematic views of two pairs of GRIN lenses and optical fibers useful for illustrating the invention.

FIG. 3 is a schematic view of a centerless grinding system useful for the fabrication of GRIN lenses to illustrate the invention.

FIG. 4 is a cross-sectional view of glass rods in a salt bath to illustrate the process of fabricating GRIN lenses.

FIG. 5 is a graphical plot of the index of refraction against the distance from center axis achieved in the ion exchange process in FIG. 3.

For simplicity in description, identical components are identified by the same numerals in this application.

DETAILED DESCRIPTION OF THE INVENTION

In this invention, by adapting a combination of procedures such as frit making, preform making, extrusion, centerless grinding and ion-exchange, a variety of thallium based glasses can be fabricated which are less susceptible to volatilization based on fluctuations in lens parameters.

The above process is highly efficient as it not only produces rods of good diametrical tolerance but also produces rods which have minimum variation in refractive index profile parameters as will be discussed later. GRIN lenses with accurate control of refractive index profile parameters along with high diametrical tolerances are desirable in fiber optic applications. Fiber diameter tolerances are typically in the vicinity of ±1 µm and if GRIN lenses matching these tolerances are used, active alignments become much easier and a push towards automation can be realized.

This invention deals with radial GRIN lenses of the above kind prepared by melting of inorganic precursors followed by formation of rods. The rods are then preferably grounded in a centerless grinding machine and are subsequently subjected to an ion-exchange process.

The production of GRIN lens in this invention entails the following main steps:

1. Frit making (a frit consists of broken and shattered glass of small pieces and random shapes obtained via rapid quenching of the melt).
2. Preform making (a preform is a compact mass of bulk glass).
3. Extrusion (a process where a glass forming liquid of high viscosity, such as around $10^6$ Pa.s, is forced out of a die by applying pressure).
4. Centerless grinding (a process where the work material, glass in our case, is ground on the outside diameter without being held on by its centers).
5. Ion-exchange (a process where selective ions in a glass are exchanged with those in a salt bath).

During the production of the frit, the chemical constituents of the glass is set. This helps in achieving the desired glass properties. In this invention homogeneous frits of thallium based alkali borosilicate compositions, in sizes of 500 gms to 5 kilograms, can be made by stirring the glass melt. In order to maintain the optical quality of the melt the stirrer is preferably made of an inert non-reactive material. Platinum seems like an ideal choice for this purpose.

In this invention, the chosen glass composition constituted inorganic precursors in the form of carbonates and oxides. In U.S. Pat. Nos. 4,495,298, 3,941,474, 4,495,299 and 4,462,663, it has been demonstrated that a glass rod with a refractive index gradient can be obtained by contacting a glass rod containing thallium with a salt bath of an alkali ion such as sodium, potassium, rubidium or cesium. The thallium ion due to its high electronic polarizability (~5.2$A^3$), as noted in "Light-focusing glass fibers and rods," by H. Kita et al., *Journal of the American Ceramic Society*, Vol. 54, No. 7, July 1971, pp. 321–326, creates higher refractive index glass and when it is replaced by lower polarizable ions such as the alkali ions, the refractive index of those layers where the ion-exchange has taken place decreases. The base glasses, as frits in the present invention, were prepared by evaluating the desired density and refractive index based on the following constituent oxides: silicon dioxide ($SiO_2$), boron oxide $B_2O_3$), sodium oxide ($Na_2O$), thallium oxide ($Tl_2O$), potassium oxide ($K_2O$), zinc oxide (ZnO) and neodymium oxide ($Nd_2O_3$).

In this invention, the amount of $B_2O_3$ that can be added to the glass has been extended to 20 mole %. Most of the earlier work noted in U.S. Pat. Nos. 3,941,474 and 4,495,299 restricted this amount to 10 mole % and suggested that the ideal range of boron oxide was <5 mole % or else it lead to phase separation. To the contrary, according to this invention, a higher amount of boron oxide not only helps to reduce the melting temperatures but it also helped reduce the phase separation effects.

The tendency of phase separation in sodium borosilicate glasses occurs when R<0.5 (R=mole %$Na_2O$/mole %$B_2O_3$) as glass can phase separate into sodium borate and silicate portions as noted in "Multinuclear nuclear magnetic resonance and Raman investigation of sodium borosilicate glass structures," B. C. Bunker et al., *Physics and Chemistry of Glasses*, Vol. 31, No. 1, February 1990, pp. 30–41. The Bunker et al. articles states that, again, for high R values, R>2, due to the formation of excess trigonal boron, chances of phase separation exist.

Thallium in glasses acts like a network modifier and behaves as an alkali ion, i.e., it is monovalent in glasses. Therefore, we found that R when represented as:

$$R=(mole\%Na_2O+mole\%Tl_2O+mole\%K_2O)/mole\%B_2O_3, \quad (3)$$

has an ideal range from about 1–1.5. The compositions for making frit, based on the above, can be designed with the constituent oxides in the following range:

| Oxide | Mole % |
|---|---|
| $SiO_2$ | 55–70 |
| $B_2O_3$ | 5–20 |
| $Tl_2O$ | 5–15 |
| $Na_2O$ | 5–10 |
| $K_2O$ | 0–2 |
| ZnO | 0–8 |
| $Nd_2O_3$ | 0–1 |

Neodymium oxide has been known to affect the surface tension properties of glass-metal interfaces. Small amounts of neodymium oxide reduce the frictional forces between extrusion dies and other parts, making it feasible to perform the extrusion process at lower pressures and temperatures. This also aids in obtaining glass rods with lesser built-in stress.

An example of a glass from the above multi-component glass system according to the invention can be as follows:

| Oxide | Mole % | Melting Temperature of Glass | Density of Glass | Refractive Index of Glass | Glass Transition Temperature |
|---|---|---|---|---|---|
| $SiO_2$ | 62.00 | 1623 K | 3.65 gms/cc | 1.621 | 768 K |
| $B_2O_3$ | 16.00 | | | | |
| $Tl_2O$ | 11.00 | | | | |
| $Na_2O$ | 5.00 | | | | |
| ZnO | 4.00 | | | | |
| $K_xO$ | 1.50 | | | | |
| $Nd_2O_3$ | .50 | | | | |

The above composition can be melted at 1623 K with continuous stirring for a time of three hours and quenched to distilled water to make glass flits. These glass frits can be then compacted at a lower temperature (1373 K), in a platinum or an alumina crucible, to make a glass preform. The fully dense preform can then be core drilled to get a solid glass preform for the extrusion process.

The softening temperatures of these glasses are typically around ~923 K which is much below the volatilization temperatures of thallium oxides. Further, the above softening temperatures are also below the phase separation and crystallization temperatures of the glasses. When the glasses are extruded at these temperatures with a typical feed pressure of 100 –500 psi, good quality rods with excellent surface finish and free of detects such as refractive index fluctuations are obtained. Another advantage of such extrusion pressures is that any internal bubbles left behind in the glass can be burst as well. Typical internal bubble pressures of non-condensable gases such as carbon dioxide, at room temperature are ~4.5 psi and can be as high as 20 psi at extrusion temperatures, as noted in "Classical Glass Technology," by M. Cable, *Materials Science and Technology: A comprehensive treatment, Glasses and Amorphous Materials*, Vol. 9, Edited by J. Zarzycki, VCH Publishers, Inc., New York. The application of high pressures during the extrusion process helps eliminate such bubbles. This aids in designing glasses free of refining agents, such as arsenic or antimony oxides, as the right amounts for particular glass compositions and melting temperatures have to be found more or less empirically. Too much of a refining agent will cause coloring and absorption problems in glasses and too little will not aid in bubble removal process, as is also noted in the Cable article referenced above.

In order to obtain good quality rods with maximum yield the extrusion process is preferably a closed loop one. FIG. 1 shows a schematic of the process. As noted above, the preform formed 13 as described above is placed in a chamber 12 of the system 10, where the preform is softened by heat from furnace 14. Chamber 12 has an opening or die 16 at one end. A piston 18 applies a force or pressure on the preform 13 in chamber 12 at the other end of the chamber, thereby forcing the melted glass preform through the die 16. The glass preform emerges from the die as a glass rod 20 which is guided and drawn by means of a pulling system 22 with wheels 22a which apply a drawing force on the rod. The diameter of the glass rod is monitored by a diameter monitoring system 24 in a manner known to those skilled in the art. Monitoring system 24 compares the diameter of the glass rod 20 that is measured to a reference value and applies a signal to an extruding force control system 30 in order to adjust the amount of extruding force applied to the piston 18, thereby controlling the diameter of the glass rod 20 so that it is substantially the same as the reference value. Alternatively, system 24 may apply a signal to pulling system 22 to control the drawing force applied by the system 22 to achieve the desired reference diameter of the rod. Thus, a closed loop system can be worked out by feeding the desired diameter values to the monitoring system with a subsequent adjustment of force either in the pulling system (drawing force) or in the pushing system (extruding force). Further, the system should obey the conservation of mass principle such that the incoming volumetric flow rate of glass at the die equals the exit flow rate.

In fiber optic applications, the GRIN lens that is used in fiber alignment to collimate, focus or couple light has to meet tight diameter tolerances. Big diametrical fluctuations from a lens will not only lead to more time consumption during active alignments but will also hinder in achieving low coupling losses. Diameter tolerances of ±1 $\mu$m are easily obtained in commercial optical fibers. Current commercial GRIN lenses have diameter tolerances of +5 $\mu$m/−10 $\mu$m. Further, these lenses have an ellipticity of 3 $\mu$m. By using centerless grinding, after the extrusion process, diameter and roundness tolerances of ±1 $\mu$m have been achieved.

FIG. 2a shows a case of lateral misalignments that can occur due to a mismatch between fiber and lens tolerances. One of the lenses is purposefully shown to be of a bigger diameter, than the other; however, it should be noted that the figure is not to scale. FIG. 2b shows the case in which both fiber and the lens have equal diametrical tolerances. Such issues will have critical impact during automation of alignment processes in fiber optic telecommunications. Although, theoretical calculations show, according to "Single mode fiber coupling efficiency with graded index rod lenses," by R. W. Gilsdorf et al., Applied Optics, Vol. 33, No. 16, June 1994, pp. 3440–3445, that losses for GRIN lens pair for misalignments of 20 $\mu$m would be only a tenth of a dB, higher losses can be expected if more than one GRIN lens pair is used in some designs. Further, diametrical control by centerless grinding, before ion-exchange, aids in controlling the diffusion parameters more critically. The centerless grinding as a whole also increases the yield of the entire process.

A suitable centerless grinding apparatus 40 is shown in FIG. 3. As shown in FIG. 3, the glass rod 20 is held and supported by a guiding blade 42 and a feed wheel 44, without being held on by the center of the rod. The rotation and translation of the glass rod is obtained by slight incline of the feed wheel 44 relative to the grinding wheel 46. The glass rod 20 is then grounded by the grinding wheel to achieve the desired diameter. Furthermore, by choosing a grinding wheel 46 with the appropriate grit size, it is possible to control the roughness of the glass rod 20. By controlling the roughness and the diameter of the glass rod, it is possible to control the diffusion parameters during the subsequent ion exchange process. By-providing a rough surface for the glass rod 20, a GRIN lens that is cut from the rod will also have a rough cylindrical surface. It will be easier to bond the rough surface of such a lens by means of epoxy to a supporting structure such as steel or another metal.

After centerless grinding, ion-exchange of the rods is performed in a salt bath mixture. In order to generate a refractive index gradient from the center to the periphery of the rod, with the center being at a higher index than the periphery, the base glass rods are immersed in a salt bath mixture whose primary constituents are potassium ions.

FIG. 4 shows a typical configuration that can be used for the ion-exchange process. As shown in FIG. 4, two glass rods 20 are held by means of a steel holder 62, which together with the glass rods are suspended in a salt bath 64 contained in a fused silica tube 66. Depending on the glass compositions, typical ion-exchange times to obtain a parabolic index profile can range from 100–600 hours for a 1.8 mm diameter base glass rod. During this time thallium ions from the base glass are exchanged with lower polarizability potassium ions from the salt. The ion-exchange process is stopped once the refractive index profile assumes the shape shown in FIG. 5. The composition of these ion-exchanged GRIN lenses can be as follows:

| Oxide | Mole % |
| --- | --- |
| $SiO_2$ | 55–70 |
| $B_2O_3$ | 5–20 |
| $Tl_2O$ | 5–10 |
| $Na_2O$ | 5–10 |
| $K_2O$ | 5–10 |
| ZnO | 0–8 |
| $Nd_2O_3$ | 0–1 |

Notice, the ion-exchanged GRIN lenses have lower thallium content but higher potassium content as compared to the base glass rod. Once, the ion-exchange process is complete the rods can be cooled down, washed off any adhering salt particles from the surface and subsequently annealed. Then, these rods are ready to be cut, ground and polished to desired lengths. In most cases, a lens that is close to quarter pitch, is desired for fiber optic applications.

While the invention has been described above by reference to various embodiments, it will be understood that changes and modifications may be made without departing from the scope of the invention, which is to be defined only by the appended claims and their equivalents.

What is claimed is:

1. A GRIN lens comprising, said materials including one or more network modifiers, 5–20 mole % boron oxide and neodymium oxide, and wherein R in the range of about 1 to 1.5, where R is the ratio of network modifiers in mole % to the network former boron oxide in mole %, so that the glass is non-phase separable.

2. The lens of claim 1, wherein said glass includes up to 1 mole % of neodymium oxide.

3. A GRIN lens comprising, said materials including one or more network modifiers, 5–20 mole % boron oxide, and wherein R in the range of about 1 to 1.5, where R is the ratio of network modifiers in mole % to the network former boron oxide in mole %, so that the glass is non-phase separable, wherein said lens is formed in a process that includes extrusion.

4. The lens of claim 3, wherein said glass includes neodymium oxide.

5. The lens of claim 4, wherein said glass includes up to 1 mole % of neodymium oxide.

6. A GRIN lens comprising, said materials including one or more network modifiers, 5–20 mole % boron oxide, and wherein R in the range of about 1 to 1.5, where R is the ratio of network modifiers in mole % to the network former boron oxide in mole %, so that the glass is non-phase separable.

* * * * *